United States Patent [19]

Musselman et al.

[11] 4,136,916

[45] Jan. 30, 1979

[54] UNITIZED SINGLE ROW TAPERED ROLLER BEARING

[75] Inventors: Lawrence L. Musselman; William E. Harbottle, both of North Canton; Joseph P. Berecek, Canton, all of Ohio

[73] Assignee: The Timken Company, Canton, Ohio

[21] Appl. No.: 890,589

[22] Filed: Mar. 20, 1978

Related U.S. Application Data

[63] Continuation of Ser. No. 810,282, Jun. 27, 1977, abandoned.

[51] Int. Cl.² .............................................. F16C 33/46
[52] U.S. Cl. ................................ 308/213; 29/148.4 C; 308/214; 308/216; 308/218
[58] Field of Search ............... 308/207, 213, 214, 216, 308/217, 218, 235, 236, 174, 212, 206, 211, 175, 176, 201, DIG. 10, 191; 29/148.4 A, 148.4 C

[56] References Cited

U.S. PATENT DOCUMENTS

| | | | |
|---|---|---|---|
| 2,435,839 | 2/1948 | McNicoll | 308/214 |
| 3,420,589 | 1/1969 | Green et al. | 308/174 |
| 3,477,773 | 11/1969 | Altson et al. | 308/214 |
| 3,689,127 | 9/1972 | Hampp et al. | 308/214 |
| 3,694,043 | 9/1972 | Tellson | 308/218 X |

FOREIGN PATENT DOCUMENTS

1286829  1/1969  Fed. Rep. of Germany ........... 308/217
1145680  3/1969  United Kingdom ..................... 308/213

Primary Examiner—Trygve M. Blix
Assistant Examiner—Douglas C. Butler
Attorney, Agent, or Firm—Gravely, Lieder & Woodruff

[57] ABSTRACT

A single row tapered roller bearing capable of taking radial loading as well as thrust loading in both axial directions has a cone provided with an integral thrust rib at the small diameter end of its raceway, a cup surrounding the cone, tapered rollers between the raceways of the cup and cone, a separate rib ring at the large diameter end of the cup raceway, and a cage for maintaining correct spacing between the rollers in the circumferential direction. The cage at one end has an outwardly directed lip which is too large to fit through the rib ring and at its other end has outwardly directed tabs which are too large to fit through the cup without deflecting. In effect, the cup and rib ring are captured between the lip and tabs on the cage, and since the rib ring and cup cannot separate, the rollers and cone remain in place, providing a bearing which is unitized sufficiently for normal handling.

16 Claims, 9 Drawing Figures

UNITIZED SINGLE ROW TAPERED ROLLER BEARING

This is a continuation of application Ser. No. 810,282, filed 6/27/1977, now abandoned.

BACKGROUND OF THE INVENTION

This invention relates in general to bearings and more particularly to a unitized bearing capable of taking radial loading as well as thrust loading in both axial directions.

While most single row tapered roller bearings are capable of accommodating thrust loading in only one axial direction, some are capable of taking the thrust loading in both axial directions. The latter are widely used in the rear axles of automobiles. The typical bearing having this capability, differs from the conventional single row tapered roller bearings in that it has a thrust rib at the large diameter end of the cup raceway and another thrust rib at the small diameter end of the cone raceway. Thus, conventional thrust loading is accommodated in the usual manner, that is the thrust load is transferred to the rollers at the raceways. However, when the thrust load is applied in the opposite direction, the rollers are compressed between the two ribs so that thrust load is transferred to the rollers through the ribs.

The thrust rib at the large diameter end of the cup is actually a separate ring which is detached during the initial assembly of the bearing, for otherwise it would be impossible to fit the conventional number of rollers between the cup and cone. Only after the rib ring, the cage, the rollers and the cone are assembled together is the cup fitted against the rib ring, and the two are usually clamped together in the housing in which the bearing is installed.

To prevent the bearing from falling apart during handling and installation into a bearing housing, it is desirable to retain the rib ring against the cup, even if only on a temporary basis. U.S. Pat. No. 3,420,589 of W. F. Green et. al. shows several ways of achieving this end. Perhaps the most popular method is to bond the rib ring to the cup with an adhesive. While this seems to be a relatively simple procedure, it is actually not since it necessitates a considerable amount of precision machining and other preparation. In particular, the opposing faces of the cup and rib ring must be perfectly flat and square which requires expensive machining operations. Also, to assure good adhesion, these faces must be ultrasonically cleaned. Then the adhesive must be applied, and this is usually a manual operation. Finally, the bearing must be placed in an oven to cure the adhesive. Aside from the foregoing, the inside diameter of the rib ring must be tapered to provide clearance for the metal cage. This is achieved during the initial machining of the rib ring, but is a costly operation since it involves machining a reverse taper, a procedure commonly referred to as back boring.

SUMMARY OF THE INVENTION

One of the principal objects of the present invention is to provide a single row bearing which has the capability of taking thrust loading in both axial directions and is unitized for handling. Another object is to provide a bearing of the type stated which is unitized by its cage. A further object is to provide a bearing, the cage of which may be injection molded from plastic. An additional object is to provide a bearing of the type stated which is easily and inexpensively assembled. Still another object is to provide a bearing of the type stated, the rib ring of which may be manufactured to more liberal tolerances on certain surface areas. These and other objects and advantages will become apparent hereinafter.

The present invention is embodied in a single row bearing having an inner race that is larger at its one end than at its other and is provided with a thrust rib at the small diameter end of its raceway, an outer race surrounding the inner race, rolling elements between the raceways of the inner and outer races, a rib ring at the large diameter end of the raceway on the outer race, and a cage configured to maintain correct spacing between the rollers. The cage has means for preventing separation of the outer race and the rib ring so that the bearing is unitized. The invention also consists in the parts and in the arrangements and combinations of parts hereinafter described and claimed.

DESCRIPTION OF THE DRAWINGS

In the accompanying drawings, which form part of the specification and wherein like numerals and letters refer to like parts wherever they occur.

DETAILED DESCRIPTION

Referring now to be drawings (FIG. 1), A designates a single row bearing which is capable of taking radial loading as well as thrust loading in both axial directions, and this bearing is normally installed in a housing H for supporting a shaft S in the housing H. The bearing A is unitized at assembly to the extent that it will remain together during normal handling and while being installed in the housing H. However, the unification which is achieved at initial assembly is not strong enough to withstand normal operating loads. Consequently, the housing H is configured to clamp across the bearing A and hold it together under operating conditions.

Figure 1:
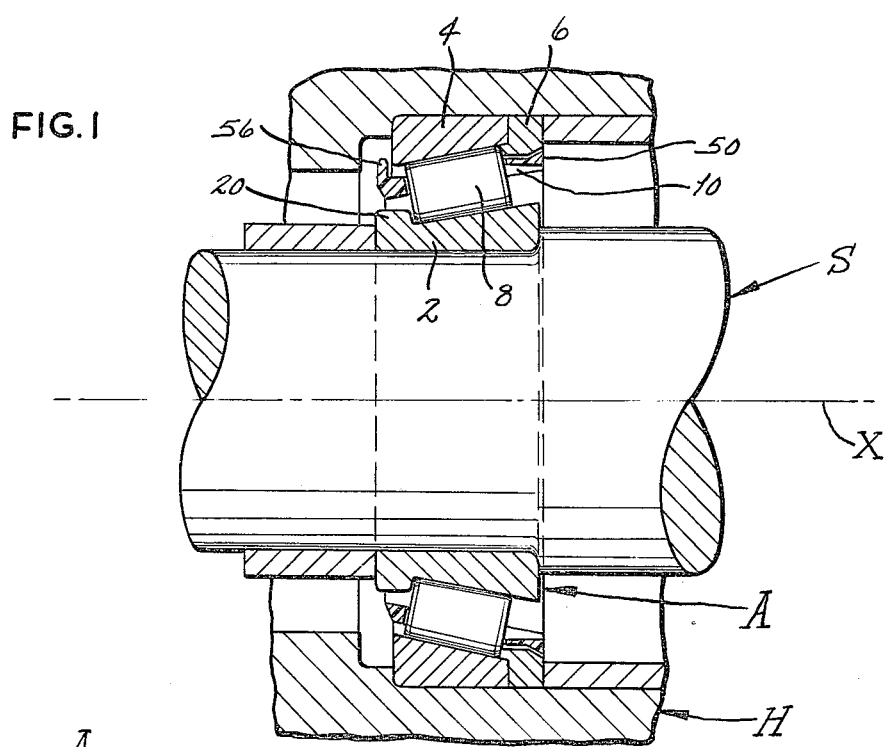
FIG. 1 is a full sectional view of a single row tapered roller bearing of the present invention installed in a housing and over a shaft.

The bearing A has five basic components, namely a cone 2, a cup 4, a rib ring 6, a complement of tapered rollers 8, and a cage 10 (FIG. 1). The cone 2 fits over the shaft S, while the cup 4 fits into the housing H through which the shaft S extends. The cup 4 surrounds the cone 2 and interposed between the two are the tapered rollers 8 which enable the cone 2 to rotate freely within the cup 4 with the axis of rotation being the axis X of the bearing A. The rib ring 6 fits against the end of the cup 4 and is located opposite the large diameter ends of the rollers 8 to prevent the rollers 8 from being expelled from the space between the cone 2 and cup 4. The cage 10 maintains the proper spacing between adjacent rollers 8 and prevents separation of the rib ring 6 from the end of the cup 4, at least when the bearing A is outside of its housing H, and this confines the rollers 8, the cage 10, and the cone 2 within the cup 4. In other words, the cage 10 unitizes the bearing A for handling purposes.

The cone 2 (FIG. 2), which is the inner race of the bearing A, has a center bore 12 through which the shaft S extends and at its ends has squared off front and back faces 14 and 16. In addition, it has a tapered raceway 18 which is presented outwardly toward the cup 4 and the taper of this surface is such that the apex of the cone defined by it is located along the axis X of rotation for the bearing A. The raceway 18 leads up to the back face 16, while the small diameter end of the raceway 18 is located adjacent to a thrust rib 20 which projects outwardly from raceway 18. The thrust rib 20 constitutes an integral part of the cone 2, and has the cone front face 14 along its one end and an abutment face 22 at its other end. The abutment face 22 is, therefore, at the small diameter end of the raceway 18.

The cup 4 (FIG. 2), which is the outer race of the bearing A, has a cylindrical external surface 24 which faces outwardly and is sized to fit into the housing H. The inwardly presented surface of the cup 4 is tapered to form a tapered raceway 26 which is located opposite the tapered raceway 18 of the cone 2. Both the cylindrical surface 24 and the tapered raceway 26 extend between front and back faces 28 and 30 which are squared off with respect to the axis of rotation X.

The rollers 8 are frustonconical in shape and have their tapered side surfaces located against tapered raceways 18 and 26 of the cone 2 and cup 4, respectively, while the small diameter ends of these rollers 8 are located adjacent to the abutment face 22. When the bearing A is subjected to radial loading, the generally radial force upon being transferred through the rollers 8 acquires an axial component which urges the rollers 8 away from the thrust rib 20 and tends to expel them from the space between the cone 2 and cup 4. The rib ring 6 prevents expulsion.

The rib ring 6 fits against the front face 28 of the cup 4 (FIG. 2) and has an outside diameter which equals or is slightly less than the diameter of the cylindrical outside surface 24 on the cup 4. The two end faces of the ring 6 are squared off with respect to the axis X so that one abuts facewise against the front face 28 of the cup 4, while the other is exposed at the end of the bearing A to receive forces applied to the bearing A. The latter or exposed end face merges into a ring bore 31 at a chamfer 32. The ring 6 may be formed with an axially directed lip or rib 34 through which the ring bore 31 extends, and the rib 34 projects a short distance into the interior of the cup 4 along the cup raceway 26. The rib 34 terminates at an abutment face 36 which is presented toward the abutment face 22 on the thrust rib 20 and bears against the large diameter ends of the rollers 8. Alternately, the rib ring 6 may be formed without the rib 34, in which case the abutment face 36 aligns with the cup front face 28. In either arrangement, the expulsion forces on the rollers 8 are resisted at the abutment face 36. Furthermore, when a thrust load is applied to the bearing A in the direction which tends to unseat the rollers 8 from the raceways 18 and 26, that is in the direction which causes the ribs 20 and 34 to move together, the abutment faces 22 and 36 of the ribs 20 and 34, respectively, bear against the ends of the rollers 8 so that the rollers 8 are compressed between the ribs 20 and 34. Finally, the rib ring 6, when held against the front face 28 of the cup 4, serves to unitize the bearing A, for it prevents the rollers 8 from leaving the space between the cone 2 and cup 4 and when the rollers 8 are in place, the cone 2 cannot be withdrawn from the cup 4.

Figure 4:
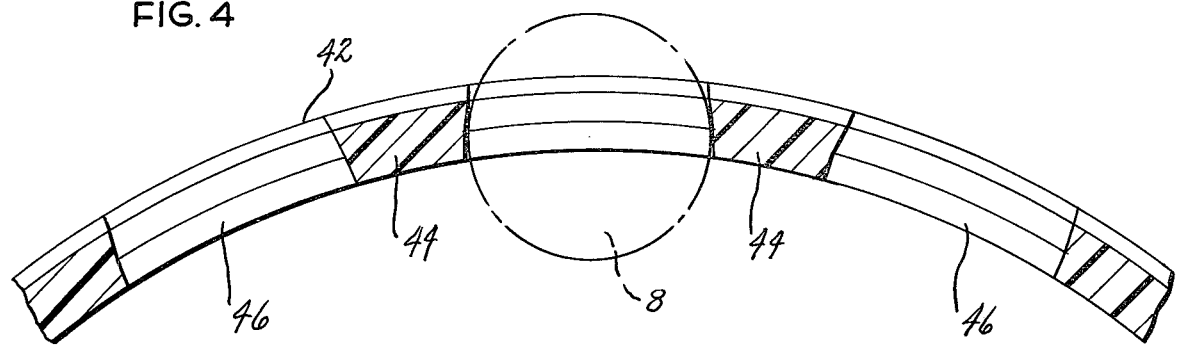
FIG. 4 is a sectional view taken along line 4—4 of FIG. 3 and showing the configuration of the cage bridges at the large end of the cage.
Figure 5:
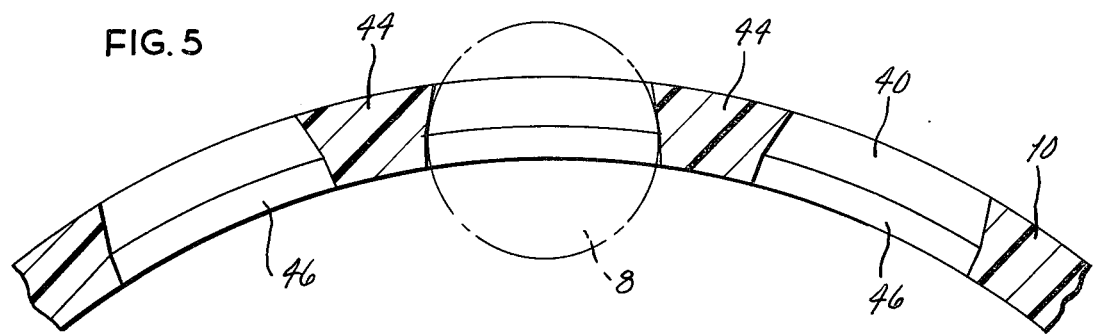
FIG. 5 is a sectional view taken along line 5—5 of FIG. 3 and showing the configuration of the cage bridges at the small end of the cage.

The cage 10 (FIG. 3) is preferably injection molded from a high strength plastic, although it may also be stamped from metal, as is the conventional practice, die cast from aluminum or some other metal, or formed by powdered metal techniques. The cage 10 includes large and small diameter rings 40 and 42, which are located in the annular space between the cone 2 and cup 4, with the former lying immediately beyond the large diameter ends of the rollers 8 and the latter being immediately beyond the small diameter ends. The two rings 40 and 42 are connected by bridges 44, thus forming a plurality of circumferentially spaced pockets 46 in the cage 10. Each pocket 46 receives a different roller 8 so that the bridges 44 are disposed between the tapered side faces of adjacent rollers 8 and maintain the proper spacing between the rollers 8. The diameters of the two rings 40 and 42 are such that the major portions of the bridges 44 are held outwardly slightly beyond the cone formed by the center lines of the rollers 8 (FIGS. 4 and 5). Moreover, the side faces of the bridges 44 are beveled slightly to conform to the contour of the rollers 8 which are against them. Consequently, the bridges 44 are wider at their outside surfaces than at their inside surfaces. The bevels on the side faces of the bridges 44 maintain the entire cage 10 in an overcenter position with respect to the rollers, that is, it enables the cage 10 to more or less float on the complement of rollers 8 and thereby prevents any one portion of the cage 10 from moving inwardly into the imaginary cone defined by the center lines of the rollers 8.

The large ring 40 of the cage 10 has a generally cylindrical outwardly presented surface 48 (FIG. 2) which lies slightly inwardly from the surface of the ring bore 31 on the rib ring 6. The cylindrical surface 48 leads up to a beveled lip 50 (FIGS. 2 and 3) which lies directly inwardly from the chamfer 32 on the rib ring 6. Indeed, the lip 50 projects outwardly into the chamfer 32 and hence is disposed beyond the ring bore 31. As a result, the lip 50 prevents withdrawal of the rib ring 6 from the cup 4. Directly beyond each brdige 44, the thickness of the large ring 40 corresponds to the thickness of the bridge 40, so that the bridges 44 appear to extend axially through the large ring 40 (FIG. 3). However, to the sides of the bridges 44, that is in the area immediately beyond the pockets 46, the large ring 40 is provided with inwardly opening reliefs 52 where the thickness of the ring 40 is substantially reduced. As a consequence, the end of each pocket 46 is closed by a relatively thin band 54, the outside surface of which constitutes part of the cylindrical surface 48 (FIG. 2) that leads up to the lip 50.

The small ring 42 has a generally uniform thickness and lies directly outwardly from the thrust rib 20 of the cone 2. At equal circumferential intervals, it is provided with retaining tabs 56 (FIGS. 2 and 3) which project outwardly and terminate opposite the cup back face 30, thereby preventing the cup 4 from backing away from the rollers 8. The tabs 56 extend only slightly beyond the inner margin of the back face 30 so that sufficient surface area remains unobscured to provide the cup 4 with an adequate backing for its back face 30.

Figure 2:
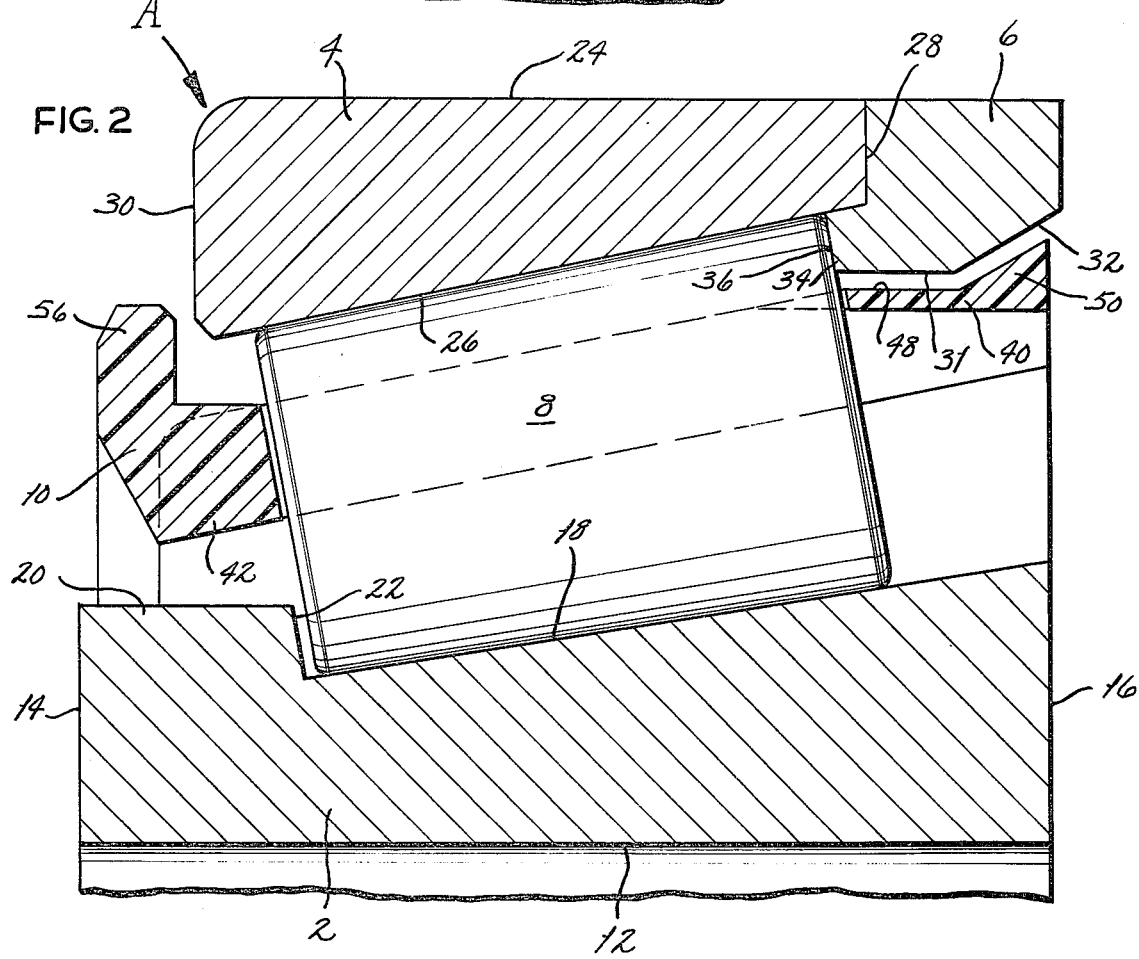
FIG. 2 is an enlarged fragmentary sectional view of the bearing.
Figure 3:
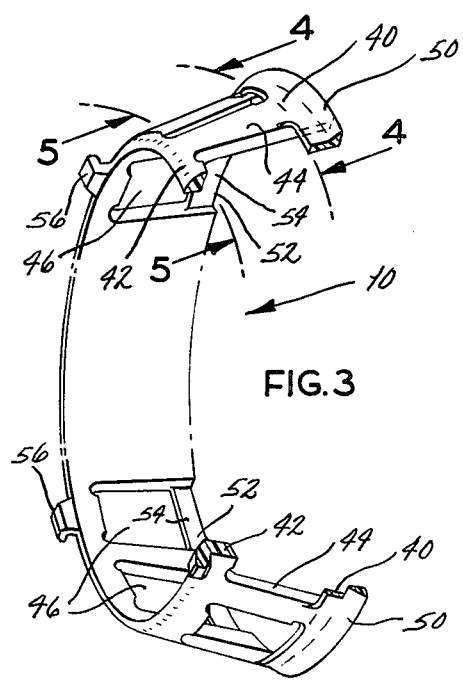
FIG. 3 is a perspective view, partially broken away and in section, of the cage.

The beveled lip 50 at the large end of cage 10 and the retaining tabs 56 at the small end serve to unitize the bearing by virtue of the fact that they project outwardly and interfere with the rib ring 6 and cup 4, respectively (FIG. 2). This prevents the cup 4 and rib ring 6 from separating. Consequently, the rollers 8 and cage 10 as well as the cone 2 are all captured in the unified cup 4 and rib ring 6. In particular, the cone 2 prevents the rollers 8 from moving radially inwardly, while the cup 4 prevents them from moving radially outwardly. The cone rib 20 and the taper of the cone and cup raceways 18 and 26 prevents the rollers 8 from being expelled in the opposite axial direction. The taper of the cone raceway 18 and the cone thrust rib 20 confine the cone 2 such that it cannot move axially in either direction with respect to the cup 4, other than for a few thousandths of an inch required for adequate clearance in the bearing A.

The cage 10 is preferably formed by an injection molding process which utilizes a mold having a center core and a shell composed of two C-shaped mold halves which, when closed, surround the core so that a mold cavity exists between the core and the shell. The mold is opened by withdrawing the C-shaped halves from one another and from the core, the movement being away from the axial center line of the core. Once the plastic injected into the mold cavity solidifies, the C-shaped halves are withdrawn from the core, leaving the cage 10 surrounding the core. Then the cage 10 is then pulled off of the mold core, it being withdrawn in the axial direction, large end first.

Figure 6:
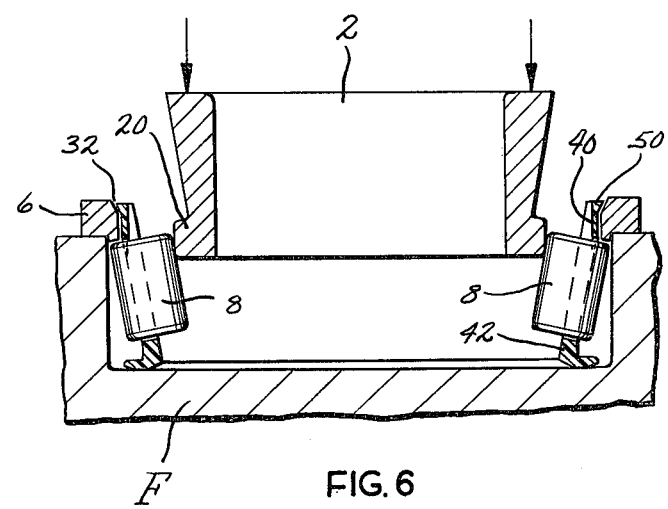
FIG. 6 is a sectional view showing the cone being inserted through the cage and rollers during assembly.

To assemble the bearing A, the rib ring 6 is set into a fixture F (FIG. 6) with its axial rib 34 projecting downwardly. Next, the small end of the cage 10 is inserted into the rib ring 6, and the cage 10 is advanced until its small ring 42 rests against the bottom of the fixture F in which case the beveled lip 50 on the large ring 40 will lie in the chamfer 32 of the rib ring 10. In this regard, every part of the cage, except the lip 50 is smaller in diameter than the bore 48 of the rib ring 6. Once the cage 10 is in place, the rollers 8 are fitted into the cage 10 by forcing them outwardly into the pockets 46 from the interior of the cage 10. The insertion force applied to the rollers 8 is sufficient to enable the bridges 44 to grip the rollers 8 and retain them in place. Next, the cone 2 is inserted into the rib ring 6 and pushed through the rollers 8 with its thrust rib 20 leading (FIG. 6). As the cone 2 advances, the thrust rib 20 spreads the rollers 8 outwardly beyond the position they normally occupy in the cage 10 and this spreading is accommodated by deflection in the bridges 44 for the cage 10. To facilitate advancement of the cone 2 through the rollers 8, the outwardly present surface of the cone thrust rib 20 may be tapered. Once the thrust rib 20 passes beyond the small diameter ends of the rollers 8, the bridges 44 force the rollers 8 inwardly toward the cone raceway 18.

Figure 7:
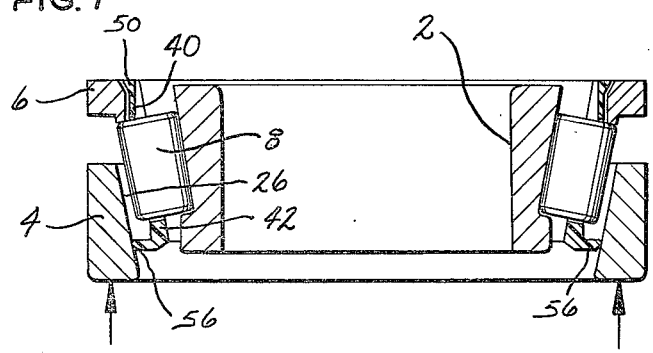
FIG. 7 is a sectional view showing the cup being installed over the cage during assembly.

The assembly which is so formed is then removed from the fixture F. Since the cage 10 is disposed in an overcenter position with respect to the complement of rollers 8 and the side faces of the cage bridges 44 are beveled to conform to the contour of the rollers 8, the rollers 8 remain around the cone 2. The rib ring 6 likewise remains in place since it is captured between the large diameter ends of the rollers 8 and the beveled lip 50 on the cage 10. Finally, the cup 4 is installed by placing the large end of its raceway 26 around the retaining tabs 56 on the small ring 42 of the cage 10 and then advancing the cup 4 toward the rib ring 6 (FIG. 7). As the cup advances, its raceway 26 bends the tabs 56 inwardly toward the rollers 8, but once the cup back face 30 passes tabs 56, the tabs 56 snap outwardly and prevent withdrawl of the cup 4. In effect, the cup 4 and rib ring 6 are captured between beveled lip 50 and the tabs 56 on the cage 10, and this unitizes the entire bearing A. The cage 10 possesses sufficient strength to resist the tendency of the cup 4 and rib ring 6 to separate during normal handling operations, so the bearing does not fall apart and become merely a multitude of individual pieces.

In use, the bearing A is installed in a housing H such that cup 4 and rib ring 6 are physically clamped together by the housing H and the cup 4 cannot move in either axial direction with respect to the housing H. The shaft S, which fits through the housing H and the cone 2 of the bearing A, has shoulders opposite each end face 14 and 16 of the cone 2 so that it is confined in both axial directions with respect to the cone 2. The bearing A, of course, takes thrust loading in both axial directions. When the thrust load is exerted in the direction which seats the rollers 8 against the raceways 18 and 26, the load is applied to the rollers at the raceways 18 and 26 and is transmitted generally transversely through the rollers 8. When exerted in the opposite axial direction, the thrust load is applied to the rollers 8 at the abutment faces 22 and 36 on the ribs 20 and 34, respectively, and is transmitted generally axially through the rollers 8. The rib ring 6 further prevents the rollers 8 from being expelled from the bearing A under radial loading, and is held against the cup 4 by the physical clamping achieved in the housing H in which the bearing A is installed (FIG. 1), not by the beveled lip 50 and retaining tabs 56 on the cage 10.

Figure 8:
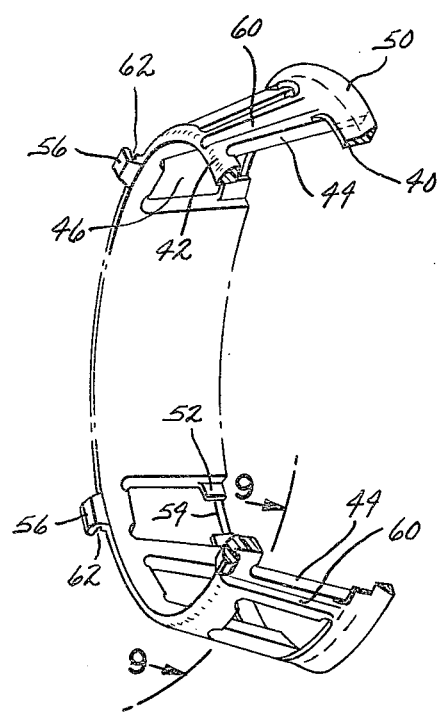
FIG. 8 is a sectional view, partially broken away, of a modified cage.
Figure 9:
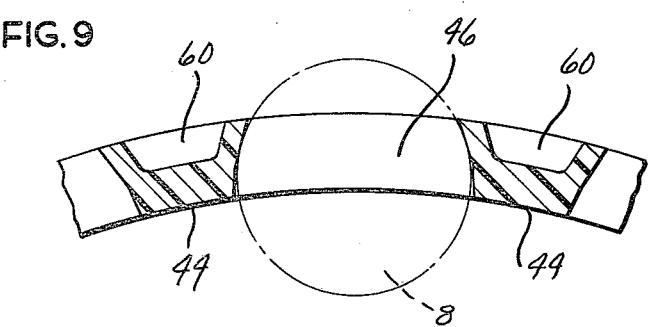
FIG. 9 is a sectional view taken along line 9—9 of FIG. 8 and showing the configuration of the cage bridges at the small end of the modified cage.

To render the bridges 44 more flexible so that they will yield somewhat more easily during assembly, that is, when the cone 2 is pushed through the rollers 8, the bridges 44 may be provided with outwardly opening grooves 60 which have their greatest depth at the small ring 42 (FIGS. 8 and 9). The opposite ends of the grooves 60 flare outwardly and merge into the cylindrical surface 48. Also, the retaining tabs 56 may be provided on their sides facing the pockets 46 with undercuts 62 (FIG. 8) which enable them to flex more easily as the cup 4 is forced over the assembled cone 2, rib ring 6, rollers 8, and cage 10. A cage 10 having the grooves 60 and undercuts 62 would not lend itself to production on a mold having two C-shaped mold halves. The core of the mold would be the same as the previous mold, but the shell which surrounds the core would be withdrawn from the core in the axial direction.

Since the rib ring 6 is not adhered to the front face 28 of the cup 4, no need exists to prepare the front face 28 and the opposite surface on the rib ring 6 for an adhesive. Likewise, the steps of applying the adhesive and curing it in an oven are eliminated. Also, the inner surface of the rib ring 6, that is, the ring bore 31, is cylindrical, and not tapered as on conventional unitized bearings, and consequently, no need exists for back boring a reverse taper.

This invention is intended to cover all changes and modifications of the example of the invention herein chosen for purposes of the disclosure which do not constitute departures from the spirit and scope of the invention.

What is claimed is:

1. A bearing capable of taking radial loading and also thrust loading in both axial directions and comprising: an inner race having an outwardly presented raceway that is larger at its one end than at its other end and a thrust rib projected outwardly from the raceway at the small diameter end thereof; an outer race surrounding the inner race and having a raceway that is presented inwardly and is larger at its one end than at its other end, the raceway of the outer race being located opposite the raceway of the inner race; rolling elements arranged in a single row between the raceways of the inner and outer races and at their sides conforming to the configuration of the raceways so to seat against the raceways, the rolling elements having large and small diameter ends with the small diameter ends being located adjacent to the thrust rib on the inner race; a separate rib ring at the large diameter end of the raceway on the outer race, the rib ring projecting inwardly from the raceway of the outer race and being located adjacent to the large diameter ends of the rolling elements; and a cage between the inner and outer races and being configured to maintain a predetermined circumferential spacing between the rolling elements, the cage having retaining means for preventing separation of the outer race and rib ring.

2. A bearing according to claim 1 wherein the retaining means for preventing separation of the outer race and rib ring project outwardly from the cage and interfere with the outer race and the rib ring.

3. A bearing according to claim 2 wherein the rib ring includes a rib which projects axially into the outer race along the raceway of the outer race.

4. A bearing according to claim 2 wherein the thrust rib for the inner race is formed integral with the inner race.

5. A bearing according to claim 2 wherein the cage is made of plastic.

6. A bearing according to claim 1 wherein the cage includes large and small diameter end rings which are located beyond the large and small diameter ends of the rolling elements, respectively, and bridges which extend between the connect the large and small diameter end rings, the bridges being located between adjacent rolling elements for maintaining the proper spacing between the rolling elements, and wherein the retaining means are on the large and small end rings.

7. A bearing according to claim 6 wherein the retaining means includes a lip which projects outwardly from the large diameter end ring of the cage.

8. A bearing according to claim 7 wherein the rib ring contains an inwardly opening relief into which the lip on the large end ring of the cage projects.

9. A bearing according to claim 8 wherein the rib ring completely encircles the lip on the large end ring of the cage.

10. A bearing according to claim 9 wherein the rib ring has an end face which is squared off with respect to the axis of the bearing and a bore which is concentric to the axis of the bearing, and the inwardly opening relief is a chamfer between the end face and the bore.

11. A bearing according to claim 7 wherein the retaining means further includes tabs which project outwardly from the small diameter end ring of the cage and are located opposite the end face of the outer race.

12. A bearing according to claim 11 wherein the tabs are yieldable to the extent that they will elastically deform sufficiently to enable the outer race to the passed completely over the cage, whereby the tabs will spring outwardly after the outer race is passed over it so as to prevent withdrawal of the outer race over the cage.

13. A bearing for accommodating thrust loading in both axial directions as well as radial loading, said bearing comprising: a cone having an outwardly presented tapered raceway and an outwardly directed thrust rib at the small diameter end of the raceway; a cup surrounding the cone and having an inwardly presented tapered raceway located opposite to the raceway on the cup; tapered rollers arranged in a single row between the cup and cone, the rollers having their tapered side faces against the raceways of the cone and cup and their small diameter ends adjacent to the thrust rib on the cone; a separate rib ring at the large diameter end of the raceway on the cup, the rib ring projecting inwardly from the raceway of the cup and being adjacent to the large diameter ends of the tapered rollers, whereby the rollers are captured between the cone thrust rib and the rib ring; and a cage between the cup and cone and having large and small end rings which are located immediately beyond the large and small diameter ends of the rollers and spacing elements which connect the end rings, the spacing elements being positioned to maintain the proper spacing between adjacent rollers, the cage further having retaining elements which project outwardly from the large and small end rings and interfere with the rib ring and cup such that the cup and rib ring are captured between the retaining elements and are not easily separated, whereby the bearing is unitized.

14. A bearing according to claim 13 wherein the retaining elements include a lip on the large end ring of the cage and the rib ring has a relief in which the lip is received.

15. A bearing according to claim 14 wherein the retaining elements also included outwardly directed tabs which project past the small diameter end of the raceway in the cup.

16. A bearing according to claim 14 wherein the tabs on the cage are yieldable to the extent that they will permit the entire cup to pass over the cage, whereby the tabs will snap outwardly beyond the small diameter end of the raceway on the cone.

* * * * *